Nov. 7, 1967 ZENJI KATAGATA 3,351,710

NARROW BAND FACSIMILE COMMUNICATING SYSTEM

Filed April 6, 1966 2 Sheets-Sheet 1

Nov. 7, 1967 ZENJI KATAGATA 3,351,710

NARROW BAND FACSIMILE COMMUNICATING SYSTEM

Filed April 6, 1966

2 Sheets-Sheet 2

United States Patent Office 3,351,710
Patented Nov. 7, 1967

3,351,710

NARROW BAND FACSIMILE COMMUNICATING SYSTEM

Zenji Katagata, Kawasaki-shi, Japan, assignor to Denki Onkyo Kabushiki Kaisha, Tokyo-to, Japan, a joint-stock company of Japan Filed Apr. 6, 1966, Ser. No. 540,731
Claims priority, application Japan, Oct. 13, 1961, 36/36,644
6 Claims. (Cl. 178—6)

This application is a continuation-in-part of prior applications Ser. No. 174,570, now abandoned, filed Feb. 20, 1962 and Ser. No. 461,659, now abandoned, filed June 7, 1965, in the name of Zenji Katagata, and entitled "Narrow Band Facsimile Communicating System."

This invention relates to a narrow band facsimile communicating system.

It has been desired to design a high performance facsimile system by compressing its transmission bandwidth, which may be utilized in various fields. Various improved facsimile transmission systems capable of satisfying the above-mentioned high performance have been made heretofore.

The present invention is also one of the high performance facsimile systems utilizing compression of its transmission bandwidth, but the bandwidth of this system is extremely compressed, so that this system is most suitable as an economical facsimile transmission system. However, the application of the system is limited mainly to black-and-white facsimile signals such as letter transmission.

The principle of the system according to the present invention will be apparent from the following analytical description. Assuming that $$\int_{-\infty}^{\infty} t \cdot f(t)dt = 0 \tag{1}$$

where $f(t)$=function of a real number. In this condition, a waveform of $f(t)$ is an even function for $t=0$.

Let us consider time width for $f(t)$ which is defined as, the following equation.

$$t^2_d = \frac{\int_{-\infty}^{\infty} |tf(t)|^2 dt}{\int_{-\infty}^{\infty} |f(t)|^2 dt} \tag{2}$$

Then, let us consider a Fourier Transformation width ($\omega_d$) which is defined by the following equation.

$$\omega^2_d = \frac{\int_{-\infty}^{\infty} |\omega F(j\omega)|^2 d\omega}{\int_{-\infty}^{\infty} |F(j\omega)|^2 d\omega} \tag{3}$$

where $F(j\omega)$=Fourier transformation. (Refer to: Books of "Advanced Calculus," "Theory of Fourier Transformation," and "Theory of Functions," etc.)

When Schwartz's equation for $$\frac{d}{dt} f(t)$$

and $tf(t)$ is used, $$\left(\int_{-\infty}^{\infty} tf(t) \cdot f'(t)dt\right)^2 \leq \int_{-\infty}^{\infty} |tf(t)|^2 dt \cdot \int_{-\infty}^{\infty} |f'(t)|^2 dt \tag{4}$$

The left side of the above equation is $$2\int_{-\infty}^{\infty} tf(t) \cdot f'(t)dt = \int_{-\infty}^{\infty} t[f^2(t)]'dt$$
$$= \left| tf^2(t) \right|_{-\infty}^{\infty} - \int_{-\infty}^{\infty} f^2(t)\,dt \tag{5}$$

Since the first term of the above equation is zero, the following equation is obtained.

$$\left(\int_{-\infty}^{\infty} |f(t)|^2 dt\right)^2 \leq 4\int_{-\infty}^{\infty} |tf(t)|dt \cdot \int_{-\infty}^{\infty} |f'(t)|^2 dt \tag{6}$$

Now, $$\int_{-\infty}^{\infty} |f(t)|^2 dt = \frac{1}{2\pi}\int_{-\infty}^{\infty} |F(j\omega)|^2 d\omega \tag{7}$$

$$\int_{-\infty}^{\infty} |f'(t)|^2 dt = \frac{1}{2\pi}\int_{-\infty}^{\infty} |\omega F(j\omega)|^2 d\omega \tag{8}$$

Therefore, $$t_d^2 \omega_d^2 \geq 1/4 \tag{9}$$

where $t_d$=effective duration time
$\omega_d$=effective angular frequency.

According to the above-mentioned reason, it can be considered that there is an inverse proportional relationship between the width of a limited energy of signal $f(t)$ and the width of Fourier Spectrum $F(j\omega)$. It will now be considered that $t_n$ is of nominal duration, and the limited signal of energy is a real number of even function for time $t$. Then the following equation as a scale of the width of $f(t)$ is obtained..

$$2t_n f(o) = \int_{-\infty}^{\infty} f(t)\,dt \tag{10}$$

Similarly, the following equation for spectrum $F(j\omega)$ is obtained.

$$2\omega_n F(jo) = \int_{-\infty}^{\infty} F(j\omega)\,d\omega \tag{11}$$

where $\omega_n$=nominal cut-off angular frequency
$t_n$=nominal duration.

The relationship between $t_n$ and $\omega_n$ is $$(t_n \cdot \omega_n) = \frac{\pi}{2}$$

From this relationship it can be said that there is an inverse proportional relation between $t_n$ and $\omega_n$ so that the highest efficient waveform is obtained by considering this relationship. The waveform for this relationship's solution is a Gaussian pulse. The above equations explain that the Gaussian pulse is the most desired waveform of a pulse in data transmission. This fact is well understood by those skilled in the art. Gaussian pulses substantially make possible distortionless transmission of an input or data signal within a narrowed band width.

This invention provides a facsimile transmitting system whereby a facsimile signal is converted into the above-mentioned Gaussian pulse, that is, the facsimile signal is transmitted by conversion into the most economical waveform with high efficiency in the wave transmission.

According to this invention, there is provided a novel facsimile communicating system of extremely narrow bandwidth comprising means for transforming the leading edge or the trailing edge of a facsimile signal pulse wave into a positive or negative Gaussian pulse or a pulse analogous to a Gaussian pulse, a circuit adapted to the Gaussian pulse or pulses analogous to Gaussian pulses with a synchronized sine wave derived from an oscillator timed by the leading edge of the facsimile signal pulse to provide a continuous sinusoidal carrier wave having a varying amplitude between a predetermined maximum value and a predetermined minimum value, and means to transmit the continuous sinusoidal carrier wave to a receiving end over a transmission line. Since the original facsimile signal pulse generated differs from a conventional photoelectric device, the continuous sinusoidal wave has only one frequency of varying amplitude so that its bandwidth is extremely narrow, thus permitting use of a transmission line or circuit of very inexpensive design, and thus increasing the operating speed and efficiency of the system.

The features of the invention which are believed to be novel are specifically set forth in the claims attached hereto. The invention and further advantages thereof will, however, be better understood from a consideration of the following description and drawing, in which:

Figure 1:
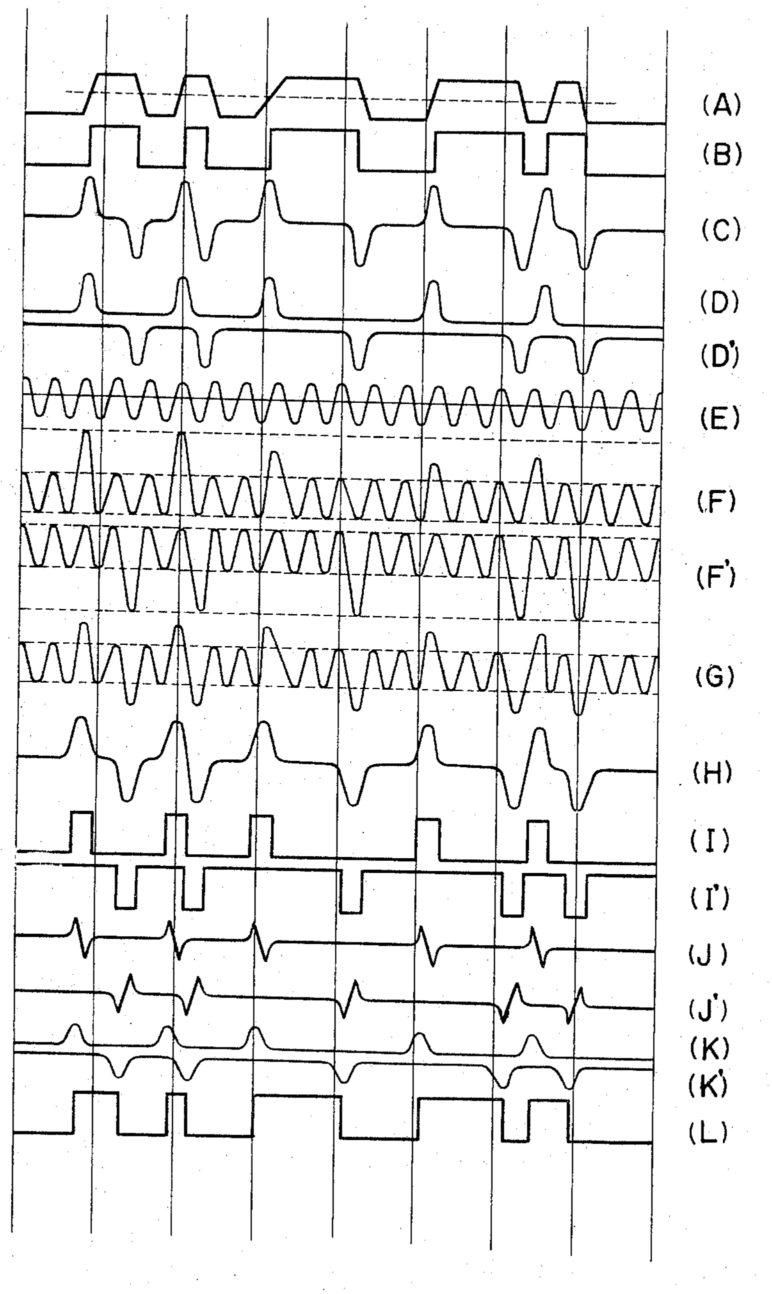
FIG. 1 is a diagram illustrating various wave forms for explaining the operation of the invention.

Referring now to the accompanying drawing, FIG. 1(A) represents an output wave from a photo-electric tube of a facsimile device, and a wave of FIG. 1(B) is obtained from the portions above the dotted line of FIG. 1(A), of the output wave which is squared by using a Schmidt circuit. The wave as shown in FIG. 1(C) is obtained by differentiating the wave of FIG. 1(B), and the positive and negative components of the wave of FIG. 1(C) are separated by a phase splitter, any device capable of dividing the pulses into positive and negative components, and used to excite two blocking oscillators, whereby the waves of FIGS. 1(D) and 1(D′) are obtained after filtering by a filter and by limiting by a limiter. FIG. 1(E) and 1(E′) (this wave is shown in only FIG. 2) represent a sinusoidal wave generated by a generating oscillator, and this wave is generally of the wave form given by sin $(\omega t+\theta)$ and is desired to have a frequency higher than $2f_m$, where $f_m$ represents the scanning frequency as determined by a mode based on a sampling theorem. That is $f_m$ is determined by the structural features of the scanner and by the material being scanned while being based on the sampling theorem. The above-mentioned wave generating oscillator is not an ordinary oscillator, but a particular oscillator utilizing the principle of drawing or utilizing pulsed-Hartley oscillator principle so as to cause an oscillation timed with a trigger which drives blocking oscillators. In multiplying circuits, the waves as shown in FIGS. 1(D) and 1(D′) are multiplied by a wave as shown in FIG. 1(E) which is operated by a positive trigger and a wave corresponding to the wave of FIG. 1(E) and shown in FIG. 2 by 1(E′) which is operated by a negative trigger, whereby waves of FIGS. 1(F) and 1(F′) are obtained. These waves of FIGS. 1(F) and 1(F′) are combined in a combining circuit and a wave of FIG. 1(G) is obtained. If the waves of FIGS. 1(D) and 1(D′) are represented by $$\sum_{n=1}^{\infty} G(t)$$

where G$(t)$ is the spectrum of the Gaussian pulses, and waves of 1(E) and 1(E′) are represented by sin $(\omega t+\theta)$, then the function F$(t)$ can be shown by $$F(t)=\sum_{n=1}^{\infty} G(t) \sin(\omega t+\theta) \qquad (12)$$

Even when $$\sum_{n=1}^{\infty} G(t)$$

represents Gaussian pulses, a transmission circuit having a relatively wide bandwidth will be required in order to transmit the wave with high fidelity. However, in facsimile communication, a phase difference up to $1/2f_m$, where $f_m$ represents the maximum scanning frequency, may be practically permissible. The width of a line of a letter and the like has generally a Gaussian or Poisson's distribution with the width of any line at the center, so that when the spectrum distribution of a previous pulse and the characteristic of facsimile and the like are considered, it is not necessary to transmit the waves in the shapes represented by FIGS. 1(F) and 1(F′), so that according to this invention $f_c$ is selected to be higher than $2f_m$ as shown by a sampling theorem. The waveforms of the pulse signals in the receiving side will be described later in the description relating to the operation of this system.

Figures 2, 3:
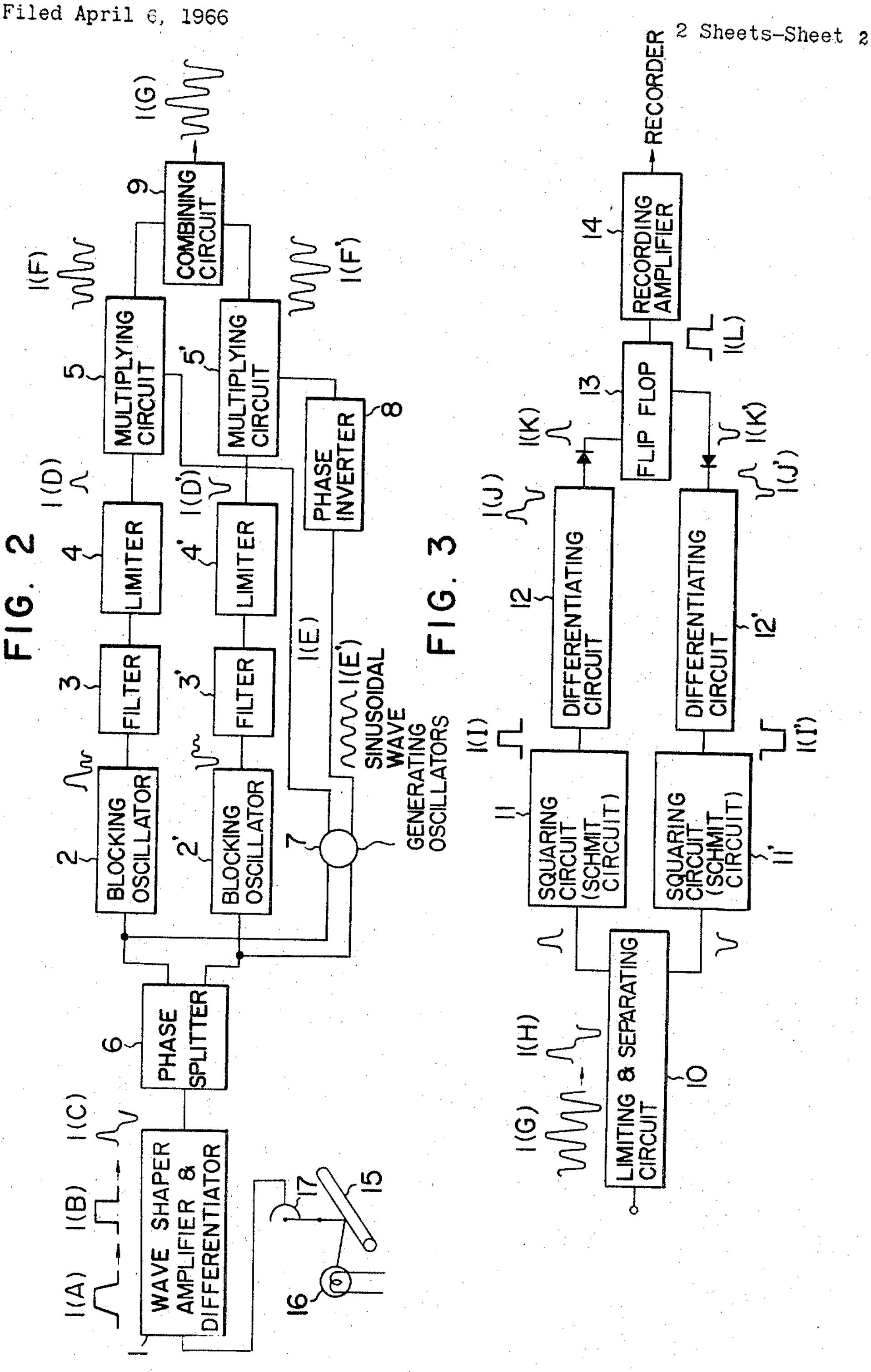
FIG. 2 is a block diagram illustrating a sending station embodying the invention.
FIG. 3 is a block diagram illustrating a receiving station embodying this invention.

Referring now to FIG. 2, in which letter references indicate the points at which the signals of FIG. 1 appear, numeral 1 represents a circuit comprising shaper, amplifier differentiator, which shapes, amplifies and differentiates electric signals which are photoelectrically transduced by a device consisting of a light source 16, a rotating drum 15 and an electric photo-cell 17. Blocking oscillator circuits 2 and 2′, filter circuits 3 and 3′, limiter circuits 4 and 4′, multiplying circuits 5 and 5′, a phase splitter 6 for phase splitting of pulse (1C), an oscillator 7 using pulling effect or operated as a pulsed-Hartley oscillator, a plate-cathode separation type phase inverter 8 which is used when the waveform of the wave 1(E′) is of inverted waveform, and a combining circuit 9 are provided. One branch circuit including the elements 2, 3, 4 and 5 connected in series and the other branch circuit containing corresponding elements connected in series are connected in parallel between the circuit 1 and the combining circuit 9 through the phase splitter 6. The output of the oscillator 7 is a carrier waveform supplied to multiplying circuits 5 and 5′ through the phase inverter 8 if necessary so as to be multiplied by the output from the limiter circuits 4 and 4′.

In FIG. 3, a receiving circuit connected to a receiving end of a transmission line to receive the output wave of the combining circuit is shown. This receiving circuit comprises a limiting and separating circuit 10 for converting the input wave thereof to positive pulses and negative pulses, two squaring circuits (Schmitt circuits) 11 and 11′ connected to said circuit 10 to receive respectively positive pulses and negative pulses, two differentiating circuits connected respectively to said squaring circuits 11, 11′ to convert the waves of FIGS. 1(I) and 1(I′) to the waves of FIGS. 1(J) and 1(J′), a flip-flop circuit 13 connected to said differentiating circuits through respective rectifiers, a recording amplifier 14 connected to output side of said flip-flop circuit, and a recorder to reproduce the facsimile signal.

The operation of this system is as follows: Referring to FIG. 2; letters written in black ink on a paper mounted on a drum 15 of FIG. 2 are transformed into electric signals by any suitable photo-electric device such as, for example, a device comprising a light source 16 and a photo-cell 17 and these electric signals (for the sake of brevity, hereunder merely termed as "signals") are amplified and then differentiated by means of the circuit 1 to produce a signal of the waveform shown in FIG. 1(C). This signal of FIG. 1(C), after phase splitting by the phase splitter 6, is introduced into the circuits of the blocking oscillators 2 and 2′. In response to a trigger signal, these blocking oscillators oscillate to generate pulses analogous to Gaussian pulses. These pulses analogous to Gaussian pulses have a frequency in the audio range and are reformed to Gaussian pulses 1(D) and 1(D′) by utilizing filters 3 and 3′ and limiters 4 and 4′. These reformed Gaussian pulses are respectively introduced into the multiplying circuits 5 and 5′. In the multiplying circuits 5 and 5′, the sinusoidal carrier waves 1(E) and 1(E′) generated by the oscillator 7 are respectively combined with the reformed Gaussian pulses. In this case, for the sake of synchronization of waveforms of the waves 1(D), 1(D′) and 1(E), 1(E′), the same pulses taken out from the phase splitter 6 are used to drive the blocking oscillators 2, 2′ and the oscillator 7. If necessary, the combined wave is passed through the very narrow band pass filter so that a refined wave will be obtained. This wave is sent out toward the receiving side. At the receiving end, the signals received are converted to the wave shown in FIG. 1(H)

by means of a limiting and separating circuit 10 and then transformed into the pulse waves such as shown in FIG. 1(I) by squaring circuits 11 and 11'. These pulse waves are differentiated by differentiating circuits 12 and 12', thereby positive side differentiated pulse wave such as shown in FIG. 1(J) and negative side differentiated pulse wave such as shown in FIG. 1(J') are obtained.

The flip-flop circuit 13 is triggered by the positive and negative components 1(K) and 1(K') of pulse waves such as shown in FIGS. 1(J) and 1(J') to produce input signals for the recording amplifier 14 to reproduce or record the reproduced wave such as shown in FIG. 1(L) on a required recording paper.

While by the above arrangement it is possible to make very narrow the band width of the transmitted signal, there will be produced a time difference of $1/2f_c$ with respect to the maximum picture frequency, where $f_c$ represents the carrier wave. However, since the width of the line is distributed in a regular manner as pointed out before, the overall characteristic of the system is improved, whereby a measure of decreasing the redundancy in facsimile and greatly reducing the bandwidth of the facsimile communicating system is provided.

In contrast to the phase shifting circuit of K. H. Power (U.S. Patent 3,050,700), the present invention utilizes a pulling oscillation phenomenon to establish timing or uses a pulsed-Hartley oscillator to establish timing. Accordingly, the thinking according to K. H. Power is fundamentally different from that of the present invention.

The concept of superposing the signal wave on the basic wave appears to exist in L. M. Potts' proposal (U.S. Patent 2,360,579), but in the present invention, the facsimile signal is encoded, and the wave so encoded is caused to be superposed. Therefore, the concept of the present invention differs fundamentally from that of L. M. Potts.

The concept of detecting and utilizing the rise part and fall part of a rectangular wave appears to exist in F. Gray's proposal (U.S. Patent 2,138,577). According to the present invention, however, this leading edge and trailing edge of pulse signal, itself, is not utilized as a signal but is used as a trigger to cause a blocking oscillator to operate. Therefore, the present invention differs in concept from that of F. Gray.

While the invention has been explained by describing a particular embodiment thereof, it will be apparent that improvements and modifications may be made without departing from the scope of the invention as defined in the appended claims.

What I claim is:

1. A facsimile system for narrow band transmission on a transmission line, comprising means for generating a facsimile signal representative of the intelligence to be transmitted in said system, a wave shape-amplifier and differentiator circuit connected to the first mentioned means to convert said facsimile signal to rectangular pulses having a leading edge and a trailing edge, shaping means for shaping said rectangular pulses, means connected to the shaping means to receive said shaped rectangular pulses and transform said rectangular pulses to pulses having positive pulse components and negative pulse components corresponding respectively to said leading and trailing edges of said rectangular pulses, a phase splitter connected to said means transforming said rectangular pulses to receive the transformed pulses and divide them into positive and negative pulses, two blocking oscillators connected independently respectively to said phase splitter in two parallel paths to receive and be driven respectively by said positive pulses and negative pulses therefrom, a pulling effect oscillator connected to said phase splitter respectively excited by said positive and negative pulses for generating a sinusoidal carrier wave, two multiplying circuits each connected to a respective one of said blocking oscillators, a filter and a limiter in series in each of said two parallel paths connecting said blocking oscillators respectively to a respective one of said two multiplying circuits, means connecting said multiplying circuits independently to said pulling effect oscillator to receive two output carrier waves thereof, and a combining circuit connected to receive the outputs of both of said multiplying circuits to develop a sinusoidal output transmitted onto said transmission line modulated in positive and negative maximum and negative values of said pulses and maximum and minimum values of said sinusoidal wave and corresponding to said facsimile signal normalized with respect to a time sequence and converted to a narrow band signal.

2. A facsimile system for narrow band transmission on a transmission line according to claim 1, in which said means connecting said multiplying circuits and said oscillator generating said sinusoidal carrier wave comprises two output leads and said carrier wave is inverted when said generating oscillator is excited by said negative pulses whereby one output along one lead is inverted, and in which a phase inverter is connected in said one lead between said oscillator and one of said multiplying circuits.

3. A facsimile system for narrow band transmission on a transmission line, comprising means generating a facsimile signal representative of the intelligence to be transmitted in said system, a wave shape-amplifier and differentiator circuit connected to said means generating a facsimile signal to convert said facsimile signal to rectangular pulses having a leading edge and a trailing edge, shaping means for shaping said rectangular pulses and means connected to the shaping means to receive said shaped rectangular pulses and transform said rectangular pulses to pulses having positive pulse and negative pulse components corresponding respectively to said leading and trailing edges of said rectangular pulses, a phase splitter connected to said means transforming said rectangular pulses to receive the transformed pulses and divide them into positive and negative pulses, two blocking oscillators connected independently respectively to said phase splitter in two parallel paths to receive and be driven respectively by said positive pulses and negative pulses, a pulsed-Hartley oscillator generating a sinusoidal wave output connected to said phase splitter so as to be respectively excited by said positive and negative pulses, two multiplying circuits connected respectively to said blocking oscillators, a filter connected to said phase splitter and a limiter in series in each of said two parallel paths connecting said blocking oscillators in said two parallel paths and to a respective one of said two multiplying circuits, means connecting said multiplying circuits to said pulsed-Hartley oscillator to receive the output thereof, and a combining circuit connected to receive outputs of both of said multiplying circuits and develop a sinusoidal output transmitted onto said transmission line modulated in positive and negative maximum and negative values of said pulses and maximum and minimum values of said sinusoidal wave and corresponding to said facsimile signal normalized with respect to a time sequence and converted to a narrow band signal.

4. A facsimile system for narrow band transmission on a transmission line according to claim 3, in which one sinusoidal wave output of said oscillator excited by negative pulses is of inverted waveform, and a phase inverter connected serially to said oscillator to invert said inverted waveform and apply it to one of said multiplying circuits.

5. A facsimile system for narrow band transmission on a transmission line, comprising means for generating a facsimile signal representative of the intelligence to be transmitted in said system, a wave shape-amplifier and differentiator circuit connected to the first mentioned means to convert said facsimile signal to rectangular pulses having a leading edge and a trailing edge, shaping means for shaping said rectangular puses, means connected to the shaping means to receive said shaped rectangular pulses and transform said rectangular pulses to pulses having positive pulse components and negative pulse components corresponding respectively to said leading and trailing edges of said rectangular pulses, a phase splitter connected to said means transforming said rectangular pulses to receive the transformed pulses and divide them into positive and negative pulses, two blocking oscillators connected independently respectively to said phase splitter in two parallel paths to receive and be driven respectively by said positive pulses and negative pulses therefrom, a pulling effect oscillator connected to said phase splitter respectively excited by said positive and negative pulses for generating a sinusoidal carrier wave, two multiplying circuits each connected to a respective one of said blocking oscillators, a filter and a limiter in series in each of said two parallel paths connecting said blocking oscillators respectively to a respective one of said two multiplying circuits, means connecting said multiplying circuits independently to said pulling effect oscillator to receive two output carrier waves thereof, and a combining circuit connected to receive the outputs of both of said multiplying circuits to develop a sinusoidal output transmitted onto said transmission line modulated in positive and negative maximum and negative values of said pulses and maximum and minimum values of said sinusoidal wave and corresponding to said facsimile signal normalized with respect to a time sequence and converted to a narrow band signal, and a receiving circuit to receive the output of said combining circuit transmitted along said transmission line comprising a limiting and separating circuit to transform the last mentioned output to positive and negative pulses, two squaring circuits connected independently to said limiting and separating circuit in two parallel paths to transform the last mentioned positive and negative pulses respectively to positive and negative rectangular waves, two differentiating circuits each connected to a respective one of said squaring circuits in series therewith in one of said paths to respectively receive said positive and negative rectangular waves for differentiation thereof and having outputs comprising positive and negative pulses, a flip-flop connected to receive the outputs of said two differentiating circuits and having an output, a recording amplifier connected to amplify the output of said flip-flop, and means connected to said amplifier to reproduce the facsimile signal.

6. A facsimile system for narrow band transmission on a transmission line, comprising means for generating a facsimile signal representative of the intelligence to be transmitted in said system, a wave shape-amplifier and differentiator circuit connected to said means generating a facsimile signal to convert said facsimile signal to rectangular pulses having a leading edge and a trailing edge, shaping means for shaping said rectangular pulses and means connected to the shaping means to receive said shaped rectangular pulses and transform said rectangular pulses to pulses having positive pulse and negative pulse components corresponding respectively to said leading and trailing edges of said rectangular pulses, a phase splitter connected to said means transforming said rectangular pulses to receive the transformed pulses and divide them into positive and negative pulses, two blocking oscillators connected independently respectively to said phase splitter in two parallel paths to receive and be driven respectively by said positive pulses and negative pulses, a wave generating pulsed-Hartley oscillator generating a sinusoidal wave output connected to said phase splitter so as to be respectively excited by said positive and negative pulses, two multiplying circuits connected respectively to said blocking oscillators, a filter connected to said phase splitter and a limiter in series in each of said two parallel paths connecting said blocking oscillators in said two parallel paths and to a respective one of said two multiplying circuits, means connecting said multiplying circuits independently to said pulsed-Hartley oscillator to receive the outputs thereof, and a combining circuit connected to receive outputs of both of said multiplying circuits and develop a sinusoidal output transmitted onto said transmission line modulated in positive and negative maximum and negative values of said pulses and maximum and minimum values of said sinusoidal wave and corresponding to said facsimile signal normalized with respect to a time sequence and converted to a narrow band signal, and a receiving circuit to receive the output of said combining circuit transmitted along said transmission line comprising a limiting and separating circuit to transform the last mentioned output to positive and negative pulses, two squaring circuits connected independently to said limiting and separating circuit in two parallel paths to transform the last mentioned positive and negative pulses respectively to positive and negative rectangular waves, two differentiating circuits each connected to a respective one of said squaring circuits in series therewith in one of said paths to respectively receive said positive and negative rectangular waves for differentiation thereof and having outputs comprising positive and negative pulses, a flip-flop connected to receive the outputs of said two differentiating circuits and having an output, a recording amplifier connected to amplify the output of said flip-flop, and means connected to said amplifier to reproduce the fascimile signal.

References Cited

UNITED STATES PATENTS

| | | | |
|---|---|---|---|
| 2,026,379 | 12/1935 | Farnsworth | 178—6 |
| 2,138,577 | 11/1938 | Gray | 330—74 X |
| 2,360,579 | 10/1944 | Potts | 178—67 X |
| 3,050,700 | 8/1962 | Powers | 328—55 X |
| 3,243,507 | 3/1966 | Macovski | 178—6 |

JOHN W. CALDWELL, *Acting Primary Examiner.*

DAVID G. REDINBAUGH, *Examiner.*

R. L. RICHARDSON, *Assistant Examiner.*